UNITED STATES PATENT OFFICE.

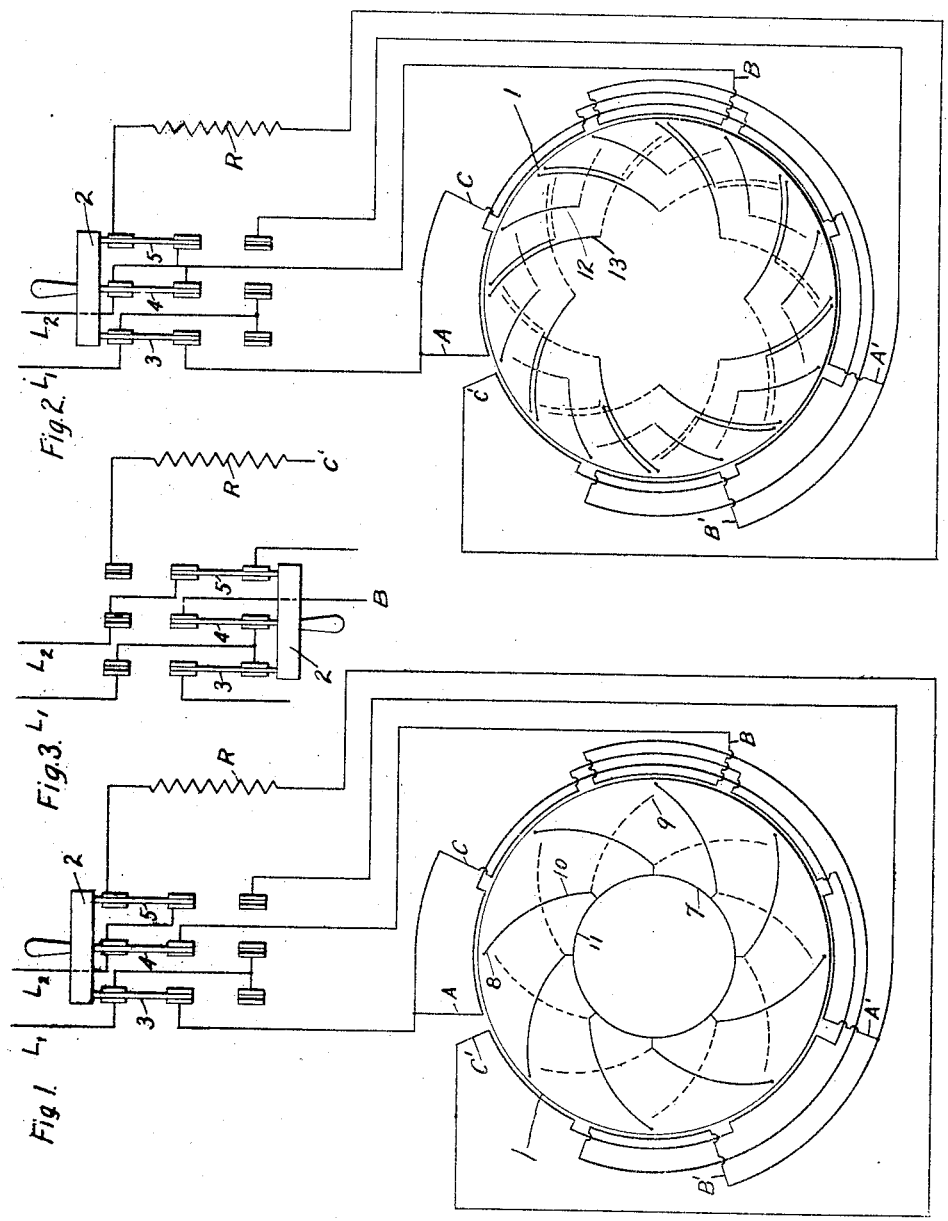

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT MOTOR.

No. 856,477.  Specification of Letters Patent.  Patented June 11, 1907.

Application filed February 27, 1904. Serial No. 195,685.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Alternating-Current Motors, of which the following is a specification.

My invention relates to alternating-current motors, and it has for its object to provide secondary windings for such motors which have high resistance under starting conditions and relatively low resistance under running conditions.

In an application Serial No. 195,684, filed by me of even date herewith, I have described an induction motor having a primary winding two portions of which may be connected in series for starting the motor and in parallel for running, the number of magnetic poles induced by the winding being thereby changed. An auxiliary winding is also provided which is either of high resistance or has an external high resistance in series with it, and is connected in parallel with the main winding in starting the motor. This motor, or any other motor using the divided circuit or split phase arrangement, is practically a polyphase machine when starting and conforms to the laws governing starting conditions of such motors.

It is generally understood that a polyphase motor requires a higher resistance in its secondary winding when starting than when running, in order to insure a large starting torque. In a single-phase motor, it is still more important that the secondary winding have a relatively low resistance when running, since the maximum torque or "pull-out" torque of the motor is dependent upon the amount of resistance in the secondary circuit, while in a polyphase motor the "pull-out" torque is independent of the resistance.

Since a single-phase motor such as I have referred to is a polyphase motor at the start, it should have, for economical starting, a secondary winding of relatively high resistance, and for running, a secondary winding of comparatively low resistance, in order to obtain the desired "pull-out" torque. It follows, therefore, that if a secondary winding can be so designed that it will have a high resistance under starting conditions, and a low resistance when the motor is running, without the employment of variable resistance or short-circuiting devices, it will furnish an ideal construction for induction motors. This cannot readily be obtained if the same number of primary magnetic poles is used in starting as in running, but if the number of poles in starting is different from that when running, an arrangement of secondary winding, provided by my present invention, can be adopted which will give circuits having different resistances for starting and running, due to the fact that the secondary circuits are different for different numbers of magnetic poles in the primary member.

In the accompanying drawings, Figures 1 and 2 represent diagrammatically the windings of induction motors constructed in accordance with my invention and Fig. 3 is a diagrammatic view of the switching device in proper position for running conditions of the motor.

In Figs. 1 and 2, the primary windings A, A', B, B' and C, C' of the motor 1 are connected by means of a three-pole, double-throw switch 2 for starting conditions of the motor. Single-phase energy is supplied to the main primary winding by means of the circuit from the line conductor $L_1$, through the switch-blade 3, windings A, A' and B', B, switch-blade 4, to line conductor $L_2$, and to the auxiliary winding by means of the circuit from the line conductor $L_1$, switch-blade 3, windings C, C', resistance R, switch-blade 5, to the line conductor $L_2$. NX poles are induced by this arrangement of windings, but if the switch is in the position shown in Fig. 3, the current is reversed in the portion B, B' of the main winding and X poles are then induced by the main primary winding, the auxiliary winding C, C' and its connected resistance R being thrown out of circuit.

In Fig. 1, the secondary member 7 is provided with a winding comprising a plurality of short-circuited, low resistance coils the opposite sides of each of which are subjected to the inductive action of poles of like polarity when the primary winding is connected for starting the motor, but which are subjected to the action of poles of unlike polarity when the primary winding is connected for running conditions of the motor. If the switch is in the position shown in Fig. 1, the conditions first above mentioned will obtain and the currents induced in the opposite sides 8 and 9 of the coil 10 will therefore oppose each other and no current can flow unless some path is furnished in addition to that in the coil itself. However, if the switch is in the position shown in Fig. 3, the poles acting upon the opposite sides 8 and 9 of the coil 10 will be of unlike polarity and current will flow in the coil 10, a short-circuited, low resistance, secondary circuit being thus provided for running conditions of the motor.

In order to provide secondary circuits of the proper resistance under starting conditions of the motor, connections may be made at each end of the short-circuited coils 10, to a high resistance ring 11, or the proper amount of resistance may be included in the connections between the ends of the coils 10 and the rings 11. It will be understood from the foregoing description that this arrangement of windings and connections insures low resistance secondary circuits for running conditions of the motor and high resistance secondary circuits for starting conditions of the motor, and this without the use of variable resistance or external short-circuiting devices.

A modification of the above described arrangement is shown in Fig. 2 and consists in the use of two independent secondary windings 12 and 13, each of which comprises a plurality of short-circuited coils. The winding 12 is of comparatively high resistance and each of its coils has a polar span that is one-half that of each of the coils 13. The opposite sides of each coil of the winding 12 are subjected simultaneously to the inductive action of poles of unlike polarity when the primary winding of the motor is connected for starting conditions; that is, for the larger number of poles. Each of the coils of the winding 13 is of low resistance and its opposite sides are simultaneously subjected to the inductive action of poles of unlike polarity when the motor is connected for running conditions; that is, for the smaller number of poles. It is therefore obvious that this arrangement also provides high resistance secondary circuits for starting and low resistance secondary circuits for running the motor.

While I have shown and described my invention as applied only to single-phase motors in which the ratio of the numbers of poles for starting and for running is two to one, it is to be understood that it is equally applicable to polyphase motors and that similar arrangements of windings are possible in motors having other ratios of the numbers of poles.

I claim as my invention:

1. In an alternating current motor, the combination with a primary member having a winding adapted to produce a plurality of numbers of magnetic poles and means for changing from one number to another, of a secondary member having a plurality of windings of different resistance that are respectively effective for different numbers of poles in the primary member.

2. In an alternating current motor, the combination with a primary member having a winding adapted to produce a plurality of numbers of magnetic poles and means for changing from one number of poles to another, of a secondary member having a plurality of separate windings, one of relatively high resistance which is effective when a large number of magnetic poles is induced in the primary member and the other of which becomes effective when the smaller number of magnetic poles is induced in the primary member.

3. An induction motor having two rotor windings or sets of short-circuited rotor-windings, one of high resistance and the other of low resistance, and means connected with the stator winding for suppressing the generation of currents in the low resistance winding at starting and for permitting the creation of currents when running, substantially as described.

4. An induction motor having a rotor with a short circuited winding or windings of low resistance and another short circuited winding or windings of high resistance, and a stator having a switch connected to rearrange the polarity of its poles at starting in a manner to cause the sum total of electrical pressures in the low resistance windings to be zero, substantially as described.

In testimony whereof, I have hereunto subscribed my name this 12th day of February, 1904.

BENJ. G. LAMME.

Witnesses:
ELISABETH M. STEWART,
BIRNEY HINES.